(12) United States Patent
Mathur

(10) Patent No.: US 12,204,948 B2
(45) Date of Patent: *Jan. 21, 2025

(54) ELASTIC DATA PARTITIONING OF A DATABASE

(71) Applicant: Salesforce, Inc., San Francisco, CA (US)

(72) Inventor: Rohitashva Mathur, Walnut Creek, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,078

(22) Filed: Sep. 8, 2023

(65) Prior Publication Data

US 2023/0418682 A1 Dec. 28, 2023

Related U.S. Application Data

(63) Continuation of application No. 17/661,840, filed on May 3, 2022, now Pat. No. 11,816,510, which is a continuation of application No. 16/252,433, filed on Jan. 18, 2019, now Pat. No. 11,354,168.

(51) Int. Cl.
*G06F 9/50* (2006.01)
*G06F 3/06* (2006.01)
*G06F 16/11* (2019.01)

(52) U.S. Cl.
CPC .......... *G06F 9/5077* (2013.01); *G06F 3/0611* (2013.01); *G06F 3/0644* (2013.01); *G06F 3/0665* (2013.01); *G06F 3/067* (2013.01); *G06F 9/505* (2013.01); *G06F 16/122* (2019.01)

(58) Field of Classification Search
CPC .................................................... G06F 9/5077
USPC .......................................................... 718/104
See application file for complete search history.

(56) References Cited

U.S. PATENT DOCUMENTS

| | | |
|---|---|---|
| 9,323,809 B2 | 4/2016 | Johnson et al. |
| 10,031,935 B1 | 7/2018 | Cole et al. |
| 11,354,168 B2 | 6/2022 | Mathur |
| 2009/0254601 A1 | 10/2009 | Moeller et al. |
| 2010/0030995 A1 | 2/2010 | Wang et al. |
| 2010/0281027 A1 | 11/2010 | Duan et al. |

(Continued)

FOREIGN PATENT DOCUMENTS

WO 2018075839 A1 4/2018

OTHER PUBLICATIONS

U.S. Appl. No. 16/252,433, Final Office Action mailed Jul. 8, 2021, 15 pgs.

(Continued)

*Primary Examiner* — Hosain T Alam
*Assistant Examiner* — Nicholas E Allen
(74) *Attorney, Agent, or Firm* — Polygon IP, LLP

(57) ABSTRACT

A database entry may be stored in a container in a database table corresponding with a partition key. The partition key may be determined by applying one or more partition rules to one or more data values associated with the database entry. The database entry may be an instance of one of a plurality of data object definitions associated with database entries in the database. Each of the data object definitions may identify a respective one or more data fields included within an instance of the data object definition.

20 Claims, 11 Drawing Sheets

(56) References Cited

U.S. PATENT DOCUMENTS

| | | |
|---|---|---|
| 2011/0196866 A1 | 8/2011 | Cooper |
| 2013/0111300 A1 | 5/2013 | Resch et al. |
| 2013/0166556 A1 | 6/2013 | Baeumges et al. |
| 2014/0032228 A1 | 1/2014 | Johri et al. |
| 2014/0108671 A1 | 4/2014 | Watson et al. |
| 2014/0129746 A1 | 5/2014 | Zhou et al. |
| 2014/0280075 A1 | 9/2014 | Huang et al. |
| 2015/0149509 A1 | 5/2015 | Leu et al. |
| 2015/0269239 A1 | 9/2015 | Swift et al. |
| 2015/0309999 A1 | 10/2015 | Ng et al. |
| 2016/0094624 A1 | 3/2016 | Mordani et al. |
| 2016/0094635 A1 | 3/2016 | Kannan et al. |
| 2016/0098448 A1 | 4/2016 | McShane |
| 2016/0253402 A1 | 9/2016 | Klots et al. |
| 2016/0335318 A1 | 11/2016 | Gerweck et al. |
| 2017/0016278 A1 | 1/2017 | Vasques et al. |
| 2017/0116278 A1* | 4/2017 | Baby ................ G06F 16/24554 |
| 2017/0177414 A1* | 6/2017 | Newbern ................ G06F 9/546 |
| 2018/0025174 A1 | 1/2018 | Mathur et al. |
| 2018/0075125 A1 | 3/2018 | Stiel et al. |
| 2018/0107697 A1 | 4/2018 | Tariq et al. |
| 2018/0107711 A1 | 4/2018 | Tariq et al. |
| 2018/0107714 A1 | 4/2018 | Tariq et al. |
| 2018/0114033 A1 | 4/2018 | Mathur |
| 2018/0129691 A1 | 5/2018 | Mathur |
| 2018/0150533 A1 | 5/2018 | Mathur |
| 2018/0292998 A1 | 10/2018 | Skjolsvold et al. |
| 2019/0004863 A1 | 1/2019 | Mainali et al. |
| 2019/0012105 A1 | 1/2019 | Schreter |
| 2020/0233848 A1 | 7/2020 | Mathur |
| 2020/0233861 A1 | 7/2020 | Mathur |
| 2022/0261294 A1 | 8/2022 | Mathur |

OTHER PUBLICATIONS

U.S. Appl. No. 16/252,433, Non Final Office Action mailed Jul. 8, 2021, 15 pgs.

U.S. Appl. No. 16/252,433, Non-Final Office Action mailed Jan. 25, 2021, 21 pgs.

U.S. Appl. No. 16/252,433, Non-Final Rejection, Aug. 26, 2020, 21 pgs.

U.S. Appl. No. 16/252,433, Notice of Allowance mailed Apr. 22, 2022, 9 pgs.

U.S. Appl. No. 16/252,448, Advisory Action mailed Apr. 27, 2021, 3 pgs.

U.S. Appl. No. 16/252,448, Final Office Action mailed Feb. 5, 2021, 24 pgs.

U.S. Appl. No. 16/252,448, Non-Final Office Action mailed Jul. 12, 2021, 23 pgs.

U.S. Appl. No. 16/252,448, Non-Final Rejection, Jul. 23, 2020, 19 pgs.

U.S. Appl. No. 16/252,454, Final Office Action mailed Jul. 30, 2021, 17 pgs.

U.S. Appl. No. 16/252,454, Non-Final Office Action mailed Jan. 27, 2021, 24 pgs.

U.S. Appl. No. 16/252,454, Non-Final Rejection, Sep. 4, 2020, 19 pgs.

U.S. Appl. No. 17/661,840, Non Final Office Action mailed Feb. 3, 2023, 35 pgs.

U.S. Appl. No. 17/661,840, Notice of Allowance mailed Aug. 16, 2023, 8 pgs.

* cited by examiner

| Date 1106 | Organization ID 1108 | Object ID 1110 | Field 1 1112 | Field 2 1114 | Partition key 1116 |
|---|---|---|---|---|---|
| 2008-11-01 19:20:207 | Org 1 | Custom Fruit | Orange | Large | 123 |
| 2008-11-02 19:20:207 | Org 2 | Custom Fruit | 14 | Yellow | 343 |
| 2008-11-03 19:20:207 | Org 1 | Custom Fruit | Apple | Small | 4536 |
| 2008-11-04 19:20:207 | Org 2 | Custom Fruit | 17 | Green | 2345 |
| 2008-11-05 19:20:207 | Org 2 | Custom Fruit | 16 | Red | 2345 |
| 2008-11-06 19:20:207 | Org 1 | Vegetable | Carrots | Large | 6753 |
| 2008-11-07 19:20:207 | Org 2 | Vegetable | Celery | Small | 7323 |
| 2008-11-08 19:20:207 | Org 1 | Custom Fruit | Kiwi | Large | 123 |

| Partition Key 1118 | Container ID 1120 |
|---|---|
| 123 | 23423 |
| 343 | 53453 |
| 4536 | 67353 |
| 2345 | 97562 |
| 6753 | 45322 |
| 7323 | 12275 |

Figure 11

ELASTIC DATA PARTITIONING OF A DATABASE

CROSS-REFERENCE TO RELATED APPLICATIONS

This application is a continuation of and claims priority to U.S. patent application Ser. No. 17/661,840 by Mathur, filed May 3, 2022, titled "ELASTIC DATA PARTITIONING OF A DATABASE", which claims priority to U.S. patent application Ser. No. 16/252,433 by Mathur, filed Jan. 18, 2019, titled "ELASTIC DATA PARTITIONING OF A DATABASE", issued as U.S. Pat. No. 11,354,168 on Jun. 7, 2022, both of which are hereby incorporated by reference in their entirety and for all purposes.

FIELD OF TECHNOLOGY

This patent document relates generally to databases and more specifically to database partitioning.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One type of service provided via the cloud is an on-demand database service. In an on-demand database service, the cloud computing service provider manages the database infrastructure, while users may store data in the cloud rather than on their premises. When constructing and managing the service, the cloud computing service provider must balance concerns such as database uptime, cost, efficiency, and request latency.

BRIEF DESCRIPTION OF THE DRAWINGS

The included drawings are for illustrative purposes and serve only to provide examples of possible structures and operations for the disclosed inventive systems, apparatus, methods and computer program products for partitioning a database. These drawings in no way limit any changes in form and detail that may be made by one skilled in the art without departing from the spirit and scope of the disclosed implementations.

FIG. 11 illustrates one example of an arrangement of data in a database, configured in accordance with one or more embodiments.

DETAILED DESCRIPTION

Figure 1:
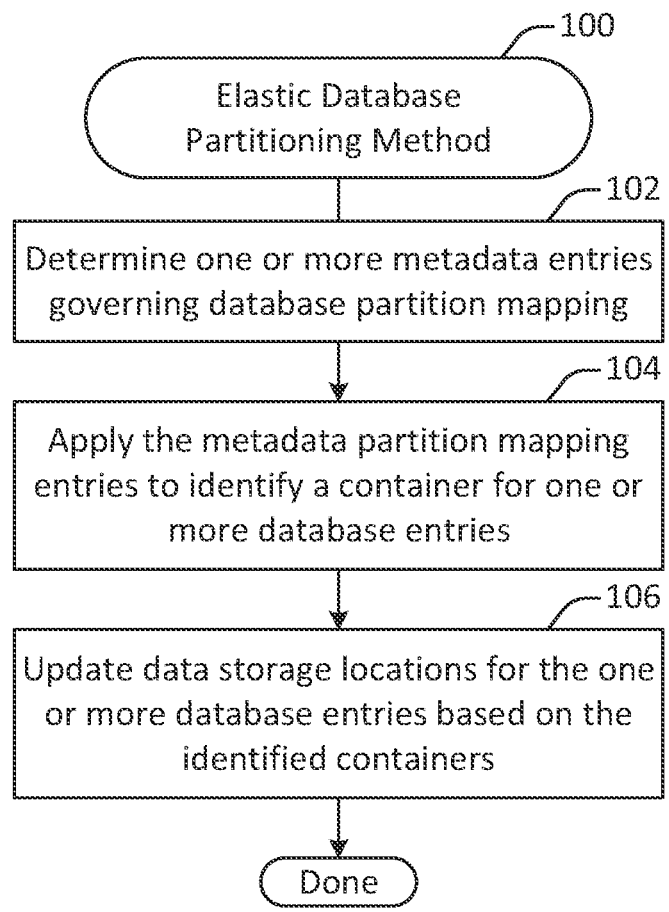
FIG. 1 illustrates an example of a method for elastic data partitioning, performed in accordance with one or more embodiments.

Techniques and mechanisms described herein provide for the elastic partitioning of databases. According to various embodiments, techniques and mechanisms described herein are generally applicable to a wide variety of databases. For example, techniques and mechanisms described herein are applicable to multi-tenant databases and dynamic-schema databases that are not amenable to conventional data partitioning techniques. As another example, techniques and mechanisms described herein are generally applicable to conventional databases in on-demand computing services environments in which each table is specific to an organization and/or a database entity type.

In a conventional database, a database table stores data owned by or associated with a single organization. However, according to various embodiments described herein, a database table may store data owned by different organizations. Such a database implementation is referred to herein as a multi-tenant database.

In a conventional database, a database table stores data associated with a standardized database entity (i.e. an object). That is, in a conventional database, each row (i.e. database entry) in a database table corresponds with an instance of an entity, and each data column corresponds with a property of that entity. However, according to various embodiments described herein, a database table may store data associated with different types of standard entities, with customized versions of standard entities, or with altogether custom entities. Such a database implementation is referred to herein as a dynamic-schema database. In a dynamic-schema database, different rows in a database table may correspond to different entities. The columns of the database table may then store entity-specific information, with the content type being defined by metadata such as an entity-specific schema.

Both multitenancy and dynamic-schema databases can provide numerous advantages, such as flexibility, reduced development and deployment costs, and resource sharing. For example, database costs tend to rise as the number of tables increases. However, when employing a multitenancy and/or dynamic-schema database, a table may be shared by multiple organizations and may store data associated with different types of entities, thus reducing the number of tables needed within the database. Nevertheless, under conventional database management approaches for dynamic-schema and/or multi-tenant databases, the data "intermingling" associated with multitenancy and dynamic schemas can adversely impact data read & write performance as well as database management.

In conventional databases, data partitioning is used to improve performance and increase data read and write speeds. Conventional databases are typically partitioned based on data clustering and access patterns so that data that tends to be read or written at the same time tends to be grouped together in the database. However, different organizations and database entities may exhibit different intrinsic data clustering and access patterns. Accordingly, partitioning techniques used in conventional databases are not applicable to partitioning in multi-tenant and/or dynamic-schema databases in which a single table may be shared by potentially many different organizations and/or entities.

According to various embodiments, techniques and mechanisms described herein provide for an elastic partitioning scheme applicable to multi-tenant and/or dynamic-schema databases. Data may be partitioned and clustered together in a way that is flexible and efficient for a given organization and database entity. Furthermore, the database may be repartitioned over time to reflect changes in the way in which data is stored and retrieved.

In conventional database systems, a database table is clustered in the same way for all rows. For example, a database table may store one type of object such as customer accounts and may store information such as name, customer account, and date for each account object. The database table may then cluster by one or more of the columns, such as name and date. However, such conventional clustering techniques do not apply to a multi-tenant configuration in which different organizations store data in the same database and may exhibit different access patterns. Further, such conventional clustering techniques do not apply in a dynamic-schema configuration in which a database table may store different object types, so the same column may store different types of data in different rows.

In contrast to conventional techniques, techniques and mechanisms described herein provide for flexible and dynamic partitioning of dynamic-schema and/or multi-tenant database tables. According to various embodiments, one or more specified clustering (i.e. partitioning) criteria may vary by organization, database object, and time. The criteria may be reduced to a string or integer value that is computed by means of goal seeking with the goal being to find a value such that a generic partitioning on this value would yield the data container of interest. A row may be assigned to the data container at the time of a write (e.g., an insert or update operation). Accordingly, the data container mapping criteria may be evaluated for a database table entry write request. The evaluation may yield an integer or string value, which the system has predetermined will yield the data container of interest, for instance when the database system invokes its internal mapping function. Such techniques may also be used to overcome the limitations that a database back end may impose on the type, depth, complexity, and online evolvability of the partitioning criteria.

In some implementations, flexible and elastic data partitioning techniques described herein may provide for substantial performance improvements over conventional techniques, including improved data read and write performance. For example, a database may enjoy measurably lower per-transaction costs for both data reads and data writes. Such improvements may be gained at least in part by reducing the number of blocks that need to be read or written to execute a query. In some configurations, the application of the flexible and elastic data partitioning techniques described herein have provided for an overall performance improvement of approximately forty percent over conventional management techniques for multi-tenant and/or dynamic-schema databases.

In some embodiments, flexible and elastic data partitioning techniques described herein may provide for improved database resilience. For example, the database may be made more resilient to data block corruption. The improvement in data block corruption may derive at least in part from a clustering configuration in which a data block is likely to be limited to a single organization and/or a single entity type. For instance, the database system could guarantee that a data block is limited to a single organization and entity type unless the container itself is shared among organizations and/or entities. For this and other reasons, the database may enjoy improved uptime.

According to various embodiments, data partitioning techniques described herein may provide for flexible, dynamic, and automatic partitioning. For example, partitioning can be performed automatically based on access patterns and/or supplied specifications. Such specifications can vary over time and based on the organization and the database entity.

Consider the situation of Acme Corp, which purchases on-demand database services from Service Provider Corp. Acme uses the on-demand database to store information about its customers. Acme's customer information is stored in a multi-tenant database along with the customer information of many other organizations. Furthermore, Acme employs a custom customer entity definition that includes Acme-specific customer information fields. The structure of the on-demand database provides Acme with decreased costs, rapid application development time, and other advantages. However, because data in the on-demand database includes custom entities associated with many different organizations purchasing on-demand database services from Service Provider, read and write requests to the database can take significant amounts of time, potentially hindering the workflow of Acme's customer service representatives and increasing on-demand database costs for Acme.

With a database configured according to one or more techniques and mechanisms described herein, Acme's access times are substantially improved. Acme can rapidly write data to the database and read data from the database. Moreover, the improved data access times are sustained even though the types of data Acme tends to read and write change over time and throughout the year. Accordingly, Acme's customer service representatives benefit from an improved overall experience when accessing Service Provider's on-demand database system.

FIG. 1 illustrates an example of a method 100 for elastic data partitioning, performed in accordance with one or more embodiments. According to various embodiments, the method 100 may be performed at one or more components of an on-demand database system. Additional details regarding on-demand database systems are discussed throughout the application, and more specifically with respect to FIGS. 8-10.

At 102, one or more metadata entries governing database partition lookup are determined. In some implementations, a metadata repository may store a variety of information to facilitate the partitioning of a database table. One type of metadata entry, referred to herein as an object definition entry, may define the fields included in a database entity. Another type of metadata entry, referred to herein as a container status entry, may store status information for a database container. The term database container is used interchangeably herein with the term database partition. Yet another type of metadata entry, referred to herein as a partition rule entry, may specify a mapping from a database entries data column values to a partition key. Such a mapping may be specific to a particular database entity and/or organization. Further, such a mapping may be specified in a generic way based on field identifiers so as to be consumable by a general-purpose rule application function. Still another type of metadata entry, referred to herein as a partition entry, maps a partition key to a container identifier, which the database may used to identify a logical storage location for database entries associated with the partition key. Additional details regarding metadata entries are discussed throughout the application, and more specifically with respect to FIG. 3.

Figure 2:
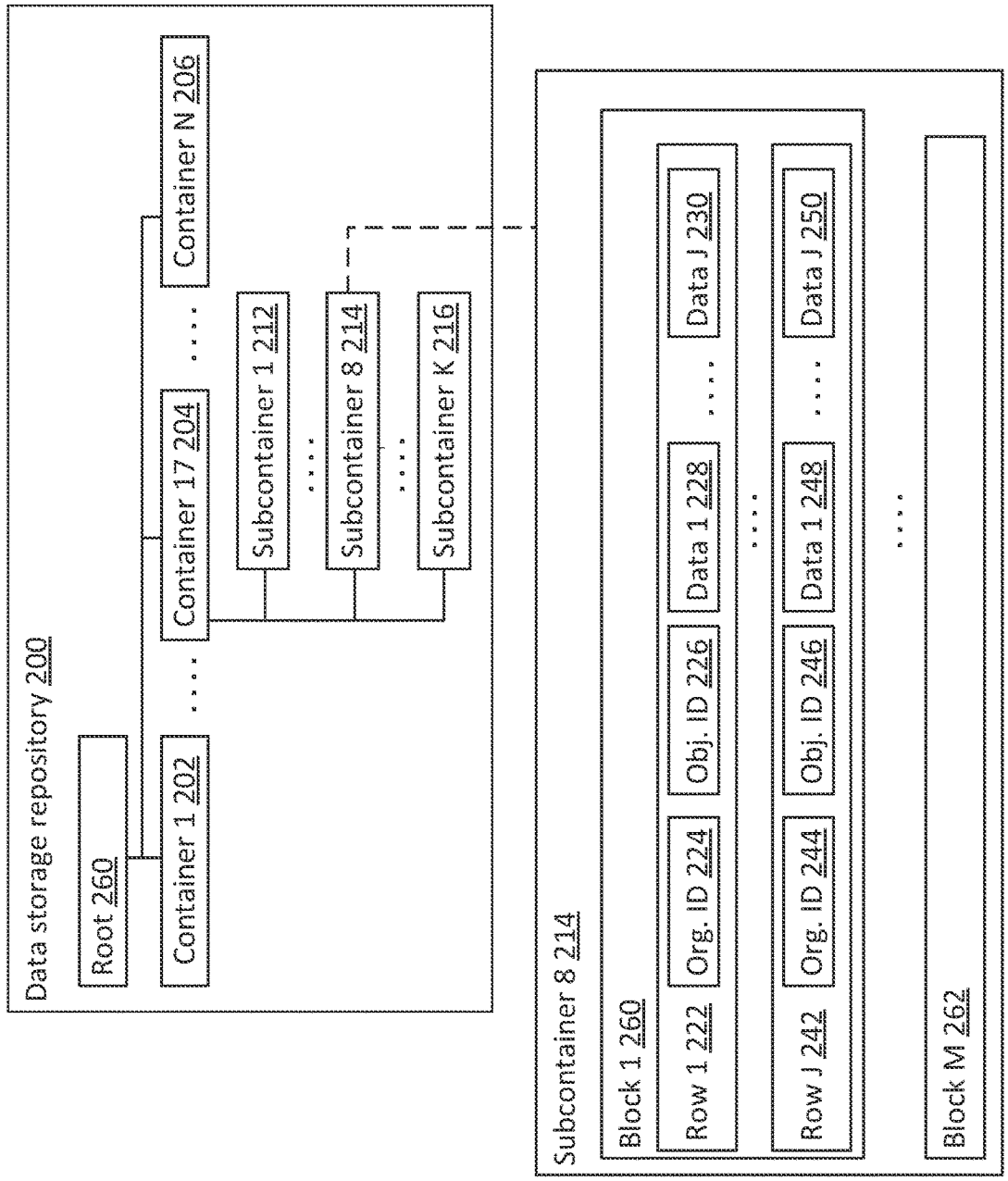
FIG. 2 illustrates a data storage repository, configured in accordance with one or more embodiments.

At 104, the metadata partition lookup entries are applied to identify a container for one or more database entries. According to various embodiments, the operation 104 may be applied to a database entry to determine a partition key for that database entry. The partition key may then map to a container identifier, which may be used by the database to point to a storage location for the database entry. FIG. 2 includes an architectural diagram that illustrates examples of such storage locations.

In some embodiments, metadata entries may be applied to newly added or updated database entries. Such techniques are discussed throughout the application, and more specifically with respect to FIG. 4. In some embodiments, metadata entries may be applied to update the storage locations of existing database entries. Such techniques are discussed throughout the application, and more specifically with respect to FIGS. 6 and 7.

At 106, data storage locations are updated for the one or more database entries based on the identified storage locations. According to various embodiments, updating data storage locations may involve any operations related to storing a designated database entry at a designated location within the database. For example, updating a data storage location may involve using a partition key associated with a database entry to determine a container identifier that points to a container at which the database entry is to be stored. As another example, when a partition key is updated for an existing database entry, the database may move the database entry from a source location corresponding with the old partition key to a destination location corresponding with the new partition key. As yet another example, when a partition key is set for a new database entry, the database may store the new database entry, along with the partition key, at a storage location within the container indicated by the partition key.

FIG. 2 illustrates a data storage repository 200, configured in accordance with one or more embodiments. According to various embodiments, the data storage repository may be implemented at least in part via an on-demand database accessible via an on-demand computing services environment, such as the environment discussed with respect to FIGS. 8-10.

According to various embodiments, a data storage repository may include one or more database tables. For example, the data storage repository 200 may include one or more tables arranged according to a multi-tenant and/or dynamic-schema configuration. As another example, the data storage repository 200 may include one or more tables arranged according to a configuration that is not multi-tenant or that reflects a fixed database schema.

The data storage repository 200 includes a root node 260. According to various embodiments, the root node 260 corresponds to a database table. The root node 260 serves as an addressable location for storing data to the database table and retrieving data from the database table.

In some implementations, a root node may include a number of partitions, which are referred to herein as containers. For example, the root node 260 includes the containers 202-206, including the container 17 204. Each container may include one or more subcontainers. For example, the container 17 204 includes the subcontainers 212-216, including the subcontainer 8 214.

The example configuration shown in FIG. 2 includes a hierarchy with two levels: containers and subcontainers. However, various types of configurations are possible. According to various embodiments, a database may include one, two, three, or any suitable finite number of levels in a partition hierarchy. Further, although the hierarchy shown in FIG. 2 refers to containers and subcontainers for the purpose of illustration, this naming convention may reflect a logical convention rather than a physical difference. Accordingly, the term "container" is used herein to refer to a partition at any level of a hierarchy.

In some implementations, a container may correspond with a logical grouping of data. For example, a container may be specific to an organization. As another example, a container may be specific to a database object. As yet another example, a container may be specific to an organization and a database object. As still another example, a container may be specific to an organization, a database object, and one or more properties of the database objects.

In some embodiments, a hierarchical structure may be used to apply one or more techniques and mechanisms described herein in a backward compatible way. For example, an on-demand database system may partition a database such that a top-level hierarchy includes a designated number of containers, such as 32 containers. Organizations may then be grouped into the top-level containers, for instance via a hash function applied to an identifier associated with the organization. In such a configuration, dynamic partitioning techniques described herein may then be applied to partition data into subcontainers within each high-level container without disrupting the existing mapping of organizations into containers.

In some embodiments, each container may include one or more data blocks. For example, the subcontainer 8 214 includes the data blocks 260-262. In some embodiments, each block may correspond to a specific portion of storage on a storage device such as a hard drive. For example, a block may include 8 kilobytes of storage space. However, depending on the system configuration, a block may include any suitable amount of storage space.

In some embodiments, a block may correspond to the smallest addressable unit of storage on a hard drive for the purpose of reading and riding data. For example, many storage disks specify a unit of size between 2 kilobytes and 64 kilobytes as the minimum addressable unit. In such configurations, the entire block would be read as a unit, even if only a portion of the block were needed to respond to a query. Similarly, the entire block would be written as a unit, even if only a portion of the block needed to be updated. Accordingly, aggregating database entries that are commonly read or written together may provide a substantial performance increase in comparison to a fragmented system in which a block stores unrelated data.

According to various embodiments, increasing the block size may decrease database overhead costs along one or more dimensions. However, in conventional configurations, an increase in block size increases the likelihood that a given block stores data associated with different organizations or different entities, thus imposing a countervailing reduction in efficiency due to increased fragmentation. In contrast to conventional configurations, techniques and mechanisms described herein allow for partitioning such as that some or all blocks only store data associated with a single organization and/or entity, allowing for larger block sizes to be used. By partitioning the database such that the data stored within a block tends to be highly related, a given query may tend to read from or write to a smaller number of blocks, thus substantially increasing database efficiency.

According to various embodiments, each block may include one or more rows, with each row corresponding to a database entry. For instance, if a database stores information associated with a customer relations management (CRM) system, a given database entry may be associated with a customer of an organization, a contact at such a customer, or a sale made to such a customer. In FIG. 2, the block 1 260 in the subcontainer 8 214 includes the rows 222-242.

According to various embodiments, each row may include an organization identifier. For example, the rows 222 and 242 include the organization identifiers 224 and 244. Each organization identifier identifies the organization that owns the data stored in the corresponding row. For example, an organization identifier may correspond with a tenant in a multi-tenant database.

In particular embodiments, techniques and mechanisms described herein may be applied to databases or database tables that are not organizes in a multi-tenant configuration. In a single-tenant configuration, a database row may not include an organization identifier. In some implementations, each row may include an object identifier. For example, the rows 222 and 242 include the object identifiers 226 and 246. Each object identifier identifies the object definition associated with the database row. For example, one row of a database may correspond with a customer of an organization, while another row of a database may correspond with a contact person at that customer. In this example, the two rows would have different object identifier values that identified the definition of a customer object and a contact object respectively.

In some embodiments, each row may include a number of data fields. For example, the rows 22 and 242 include the data fields 228-230 and 248-250 respectively. Each data field may store a data value for the database entry represented by the row. For example, if a database row corresponds with a customer of an organization, data fields within that row may store information such as the customer name, customer address, customer phone number, date in which the customer was added to the database, and other such customer-level information.

In some implementations, such as dynamic-schema database configurations, the same data field may store different types of information in different rows. For example, if the row 1 222 corresponds with a customer of an organization, the data field 1 228 may store the customer name. In this example, if the row J 242 corresponds with a contact person at that customer, then the data field 1 248 may correspond with the phone number of the contact person.

According to various embodiments, in dynamic-schema database configurations, the information stored in a particular data field may be defined according to one or more metadata entries. Techniques and mechanisms associated with metadata entries that support dynamic-schema database configurations are discussed throughout the application, and more specifically with respect to FIG. 3.

In particular embodiments, not all data values need to be filled for each database entry. For example, a database table may be configured with a fixed number of fields, such as 100 or 1,000. However, an individual database entry may be associated with an object definition that only employs 50 data fields. For such a database entry, only 50 data fields may be filled even though the row includes space for more.

In some embodiments, each row may include a partition key. For example, the rows 222 and 242 include the partition keys 232 and 252. According to various embodiments, a partition key may be used by the database to identify the container and/or subcontainer in which the database entry is stored. For example, in FIG. 2 the partition key associated with a row identifies the subcontainer in which the database entry is stored. The example configuration shown in FIGS. 2 and 3 involves a one-to-one mapping mapping between partition key and container identifier. Accordingly, in this example the values stored in the partition key 232 and 252 are identical since these two rows are both stored in the subcontainer 8 214. Additional details regarding the mapping of partition keys to container identifiers are discussed throughout the application, and more specifically with respect to FIG. 3.

FIG. 2 represents a simplified example of a data storage repository. For instance, in FIG. 2, only two rows and two blocks are shown. However, database tables often contain many database entries divided among many database rows. For example, a database table may store thousands, millions, billions, or trillions of rows divided among similarly large numbers of data blocks. As another example, a database table may include any suitable finite number of containers and subcontainers.

Figure 3:
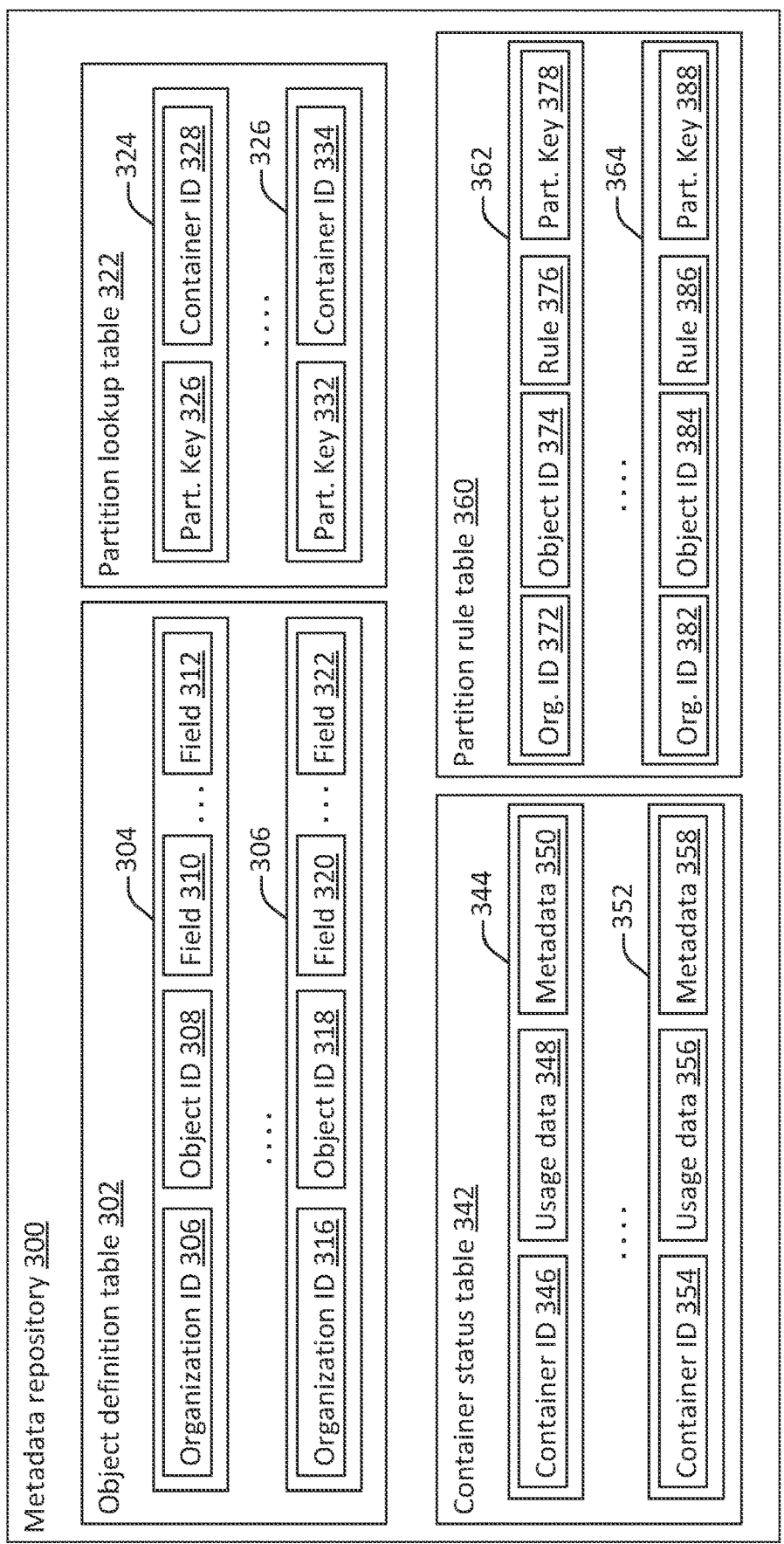
FIG. 3 illustrates an example of a metadata repository, configured in accordance with one or more embodiments.

FIG. 3 illustrates an example of a metadata repository 300, configured in accordance with one or more embodiments. According to various embodiments, the data storage repository may be implemented at least in part via an on-demand database accessible via an on-demand computing services environment, such as the environment discussed with respect to FIGS. 8-10.

The metadata repository 300 includes an object definition table 302. The object definition table 302 stores object definitions for dynamic-schema database objects that may be stored within a database table. The object definition table 302 includes the object definitions 304-306. Each object definition entry includes an object identifier that identifies the object defined by the object definition. For example, the object definitions 304 and 306 include the object identifiers 308 and 318.

According to various embodiments, in a multi-tenant configuration an object definition entry may include an organization identifier. For example, the object definitions 304 and 306 include the organization identifiers 306 and 316. The presence of an organization identifier may allow for the creation of organization-specific object definitions. For example, a standard customer object may include a designated set of fields. However, different organizations may wish to expand the standard customer object to include additional, organization-specific fields.

In some implementations, an object definition entry may include one or more field data definitions. For example, the object definitions 304 and 306 include the field data definitions 310-312 and 320-22. Each field definition may identify the information included in a designated data field in a database entry corresponding to the identified object. For example, if the object definition entry 304 corresponds to a custom definition of a customer object, then the field 310 may indicate that the data J 230 field in Row 1 222 in FIG.

2 stores an organization-specific customer type field for the customer. In this example, the field is specific to the organization associated with the organization ID 306.

In particular embodiments, each object definition entry may include all field data definitions for a given object and organization. Alternately, each object definition entry may include a single field definition for a given object and organization, with each object and organization having a separate field object definition entry for each field.

The metadata repository 300 includes an object definition table 302, a partition lookup table 322, a container status table 342, and a partition rule table 360. According to various embodiments, the tables included in the metadata repository 300 are configured to facilitate the management of one or more partitioned, multi-tenant, dynamic-schema database tables such as the table discussed with respect to FIG. 2. In some implementations, a metadata repository 300 may include additional tables not shown in FIG. 3, or may include tables arranged in a different configuration than that shown.

In some implementations, each container in a database table may correspond with a container status entry in the container status table 342. The container status table 342 includes the container status entries 344-352. Each container status entry may contain metadata information about the corresponding container. For example, the container status entry 346 may corresponds with the subcontainer 8 214 shown in FIG. 2, while the container status entry 352 that corresponds to a different database container.

In some embodiments, the container associated with a container status entry may be identified by a container identifier. For example, the container status entry 344 includes the container ID 346, while the container status entry 352 includes the container status entry 354. The container identifier may be used to perform operations such as locating a container with the database system.

In some implementations, a container identifier may be managed by a database back end, and may not be alterable at the metadata level. For example, when a database front-end requests that a new database container be created, the database back-end may create a new container with a new container identifier and then provide that identifier to the front-end, for example for the purpose of creating a correspondence table or maintaining container status information.

In some implementations, a container status entry may store usage data about a container. For example, the container status entries 344 and 352 include usage data 348 and 356. Usage data may include, for example, a number of database entries stored in the storage container.

In some embodiments, a container status entry may store various types of metadata about a container. For example, the container status entries 344 and 352 include the metadata 350 and 358. The specific type of metadata stored may depend on system-specific configuration information and may be strategically determined by, for instance, a database administrator.

In some implementations, metadata information may specify a storage type for the storage container. For example, container status metadata may indicate that a container is to be stored in highly accessible storage that is associated with a relatively high storage cost but that provides for relatively rapid storage and retrieval. As another example, container status metadata may indicate that a container is to be stored in relatively inaccessible storage associated with a relatively low storage cost but involving relatively slow storage and retrieval. Such storage type information may affect, for instance, the type of physical storage media (e.g., PCIe, solid state drive, spinning hard disk, etc.) on which a container is located. Alternately, or additionally, storage type information may affect other storage attributes, such as network configurations for accessing the physical storage media on which a container is located.

The metadata repository 300 includes a partition lookup table 322. According to various embodiments, the partition lookup table includes a number of partition lookup entries that each maps each partition key to a partition identifier. For example, the partition lookup table 322 includes the partition entries 324-326 that map the partition keys 326-332 to the container identifiers 328-334.

In some implementations, the partition lookup table may be generated in a manner that relies on a native partitioning function of the database. Such a partitioning function may be based on a hash function or may be constructed in some other way. Accordingly, a partition lookup table 322 may be generated by first requesting the creation of a designated number of containers, which may result in the database back-end providing a corresponding list of container identifiers. Then, partition keys may be identified that when provided to the partitioning function generate the provided container identifiers. A partition key may be any suitable data type, such as an integer, string, hexadecimal, or float value.

In particular embodiments, partition keys may be chosen to enforce a one-to-one mapping between partition key and container identifier. However, a one-to-one mapping need not be enforced in all systems. In some configurations, a many-to-one mapping between partition key and container identifier may be employed.

The metadata repository 300 includes a partition rule table 360. According to various embodiments, a partition rule table 360 includes a number of partition rule entries. For example, the partition rule table 360 includes the partition rule entries 362-364. Each partition rule entry identifies a partition key to be assigned to a database entry based on the attributes of that database entry.

In some implementations, a partition rule may be specific to an organization and/or an object identifier. For example, the partition entries 362 and 364 include the organization identifiers 372 and 382 and the object identifiers 374 and 386. Alternately, a partition rule may apply to multiple organizations and/or object types. For example, standard objects may be similarly partitioned across multiple organizations.

According to various embodiments, each partition rule entry includes a partition rule. For example, the partition entries 362 and 364 include the partition rules 376 and 386. Each partition rule may identify an expression that may be evaluated based on one or more characteristics of the data associated with an instance of the object definition corresponding with the object identifier. For example, the expression may be defined as a Boolean expression over the data values included in the object instance.

Consider the example of a partition rule that applies to a Sales Lead object that has been customized for an organization ("Acme") to include fields associated with Estimated Dollar Value and Industry. The partition rule may specify that Sales Lead objects in excess of a designated Estimated Dollar Value (e.g., $10,000) and within a designated Industry (e.g., Energy) be assigned a partition key of 11235813. In this example, the object definition table 302 includes an object definition entry that identifies the Estimated Dollar Value as being stored in Field_123 and the Industry as being stored in Field_205 for the Sales Lead object in association with the Acme organization. The partition rule may then be expressed conceptually as: "if(Estimated Dollar Value>$10,000 and Industry==Energy) then Partition Key=11235813". However, the rule may be expressed in the database as "(Field_123>$10,000 and Field_205==Energy) →11235813." Expressed in such a way, the rule may be executed by a function without needing to retrieve the object definition mapping for the Sales Lead object from the object definition table 302.

In some implementations, database tables or metadata tables such as those shown in FIGS. 2 and 3 may include elements that are not depicted in those figures. For example, database tables commonly include index values to facilitate more efficient storage and retrieval and/or queries such as join operations.

FIG. 11 illustrates one example of an arrangement 1100 of data in a database, configured in accordance with one or more embodiments. FIG. 11 depicts a stylized example of data, constructed for the purpose of illustration. The arrangement 1100 includes a database table portion 1104 and a partition lookup table portion 1102.

The database table portion 1104 includes a date column 1106, an organization ID column 1108, an object ID column 1110, a field 1 column 1112, a field 2 column 1114, and a partition key column 1116. According to various embodiments, the date column 1106 stores a date on which the database entry was last updated.

The organization ID column 1108 stores an identifier corresponding with a tenant organization in a multi-tenant database. In the stylized example shown in FIG. 11, the database table portion 1104 stores data associated with only two organizations. However, a database table in a multi-tenant database may potentially store information associated with a large number of tenants. An organization identifier may be represented as a string, an integer, or any suitable value. However, for the purposes of illustration the two organizations are referred to as "Org 1" and "Org 2".

The object ID column 1110 stores an identifier associated with an object definition. An object identifier may be represented as a string, an integer, or any suitable value. However, for the purposes of illustration the object identifiers are referred to as "Custom Fruit" and "Vegetable". In this stylized example, Vegetable is a standard object that may be used by different organizations, while Custom Fruit corresponds to an organization-specific object, versions of which have been created by Org 1 and Org 2.

Each of these objects is associated with one or more object definition entries, which are not shown in FIG. 11. The object definition identifies the contents of the fields associated with the database entry. For example, the Custom Fruit object in association with Org 1 is associated with an object definition that specifies that Field 1 contains the fruit name, while Field 2 contains the fruit size. As another example, the Custom Fruit object in association with Org 2 is associated with an object definition that specifies that Field 1 contains the number of fruit items while Field 2 contains the color of the fruit. As yet another example, the standard Vegetable object may be associated with an object definition that specifies that Field 1 contains the vegetable name, while Field 2 contains the vegetable size.

The partition key column 1116 includes a partition key determined by applying a partition rule function to the field values for the row. As discussed herein, partition rules may be specific to an organization and/or an object identifier to reflect organization-specific and/or object-specific access patterns and/or criteria. For example, one organization-specific rule may specify that a Custom Fruit entry associated with Organization 1 are to be stored in container 23423 if the entry has a size of Large and is either an Orange or a Kiwi. To facilitate rapid execution and avoid the necessity of retrieving the object definition, such a rule may be expressed in a form such as: "if((Field_1=Orange OR Field_2=Kiwi) AND Field_2=Large) then (container=23423)."

The partition lookup table 1102 maps partition keys to container IDs. As discussed herein, the partition key may be chosen such that when a mapping function is applied to the partition key, the function yields the desired container ID. Then, the appropriate partition key for a given database entry may be stored in the partition key column 1116. For example, the partition key 123 may be chosen for association with the container ID 23423 because the lookup function hashes or otherwise maps 123 to 23423.

Figure 4:
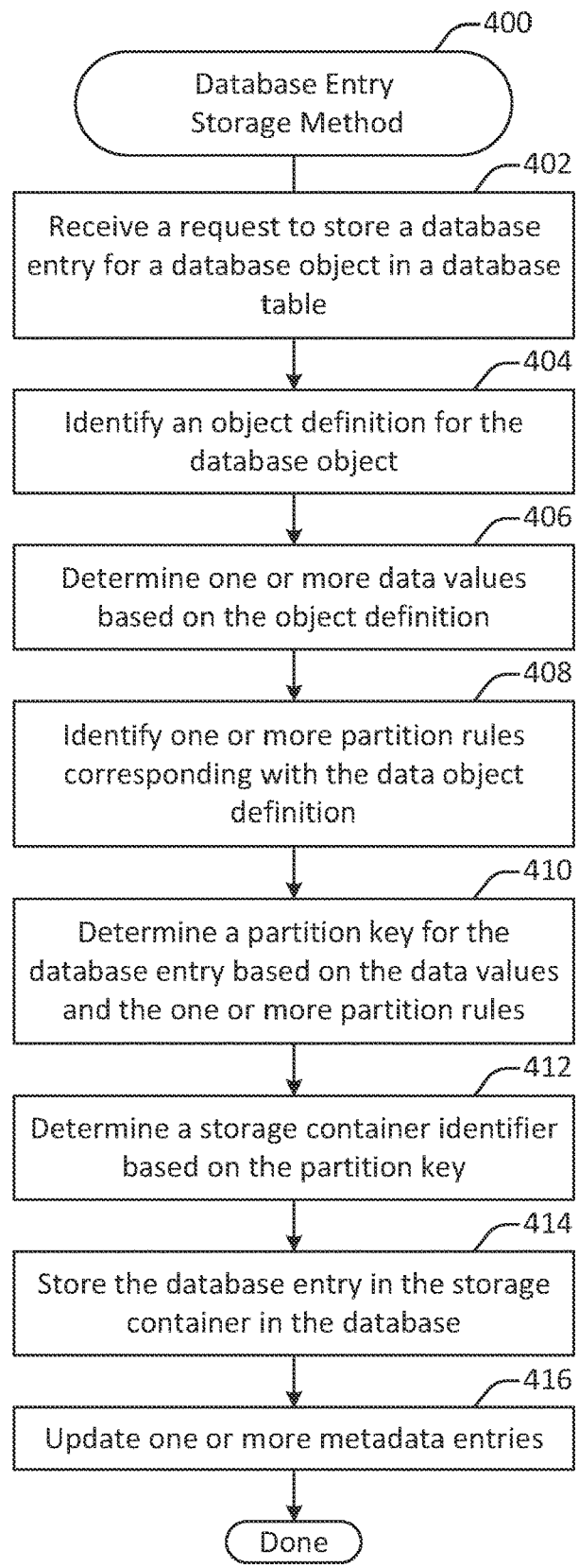
FIG. 4 illustrates a method for storing a database entry, performed in accordance with one or more embodiments.

FIG. 4 illustrates a method 400 for storing a database entry, performed in accordance with one or more embodiments. According to various embodiments, the method 400 may be performed at one or more components of an on-demand database system. For example, the method 400 may be performed at least in part at an application server such as the application server 850 in communication with the tenant database 822.

At 402, a request is received to store a database entry for a database object in a database table. According to various embodiments, the request may be received as part of the execution of an application. For example, a user may interact with a user interface via an application such as a web browser to access information stored in an on-demand database system. Through the application, the user may request to create a new database entry such as a new customer object. Information associated with the object to be created, such as a customer name (e.g., "WidgetCo") and customer size (e.g., 575 employees), may be provided through the interface. The request may then be transmitted from a client machine to the on-demand database system. The request may identify information such as an organization identifier for the organization associated with the request and an object identifier for with the database object to which the request applies.

In some implementations, the request may be generated automatically as part of the execution of the application. For example, an application running within the on-demand computing services environment may perform some operation with respect to a set of records and then automatically generate a request to update those records based on the performance of the operation.

An object definition for the database object is identified at 404. In some implementations, the object definition may be identified by using the organization identifier and the object identifier received with the request to query the object definition table 302. As discussed with respect to FIG. 3, the object definition table includes object definition entries that define the fields included in custom objects that may be stored in the database.

One or more data values for the database entry are determined at 406 based on the object definition. In some embodiments, the data values may be determined by mapping the information received at 402 with the request to store the object to the fields specified by the object definition. For example, if the object definition specifies that the customer name and customer size are to be stored in Field_231 and Field_252, then a database store request may be formulated that provides the customer name and customer size received with the request for storage in those fields. In the example discussed above, Field_231=WidgetCo and Field_252=575.

At 408, one or more partition rules corresponding with the data object definition are identified. According to various embodiments, the one or more partition rules may be identified by using the organization identifier and the object identifier to query the partition rule table 360. As discussed with respect to FIG. 3, the partition rule entry retrieved from the partition rule table 360 includes a rule that identifies a partition key to use for the database entry based on one or more values to be stored in the database entry fields. Because an object may be associated with multiple partitions, more than one partition rule may be retrieved. For example, a customer object may be associated with one rule specifying that customers objects having a value for field_252 (i.e. customer size) of between 500 and 1000 employees are to be stored in partition 35232 and another rule specifying that customers objects having a value for field_252 (i.e. customer size) of between 1000 and 2000 employees are to be stored in partition 24843.

A partition key is determined for the database entry at 410 based on the data values and the one or more partition rules. In some implementations, the partition key may be determined by applying one or more of the partition rules to the field values determined at 406. For example, in the case of WidgetCo, because Field_252=575 and 575 is between 500 and 1000, the database entry will be stored with a partition key of 35232.

As shown in FIG. 2, a database entry may include an organization identifier, an object identifier, one or more data fields as specified by the object definition, and a partition key. Because these values have been received or determined (e.g., at operations 402, 406, and 410), the prospective database entry is now ready for transmission to the database back end for storage.

At 412, a storage container identifier is determined based on the partition key. According to various embodiments, the storage container identifier may be determined by using the partition key to query the partition lookup table 322. The partition lookup entry retrieved from the partition lookup table 322 includes a container identifier that may be used by the database back end to locate the container in which to store the database entry.

The database entry is stored in the database table within the identified database table container at 414. According to various embodiments, storing the database entry may involve adding a database entry based on the identified information to a storage block (e.g., block 1 260) within the identified storage container (e.g., subcontainer 8 214). For example, the database may be parallelized over multiple machines, each of which may be responsible for one or more containers. Storing the database entry may then involve transmitting a storage message to the machine responsible for the identified container.

One or more metadata entries are updated at 416. In some implementations, any of various types of metadata entries may be updated. For example, database usage metadata may be updated in the container status table 342 to reflect the newly added database entry. As another example, one or more database keys or indexes may be updated.

Figure 5:
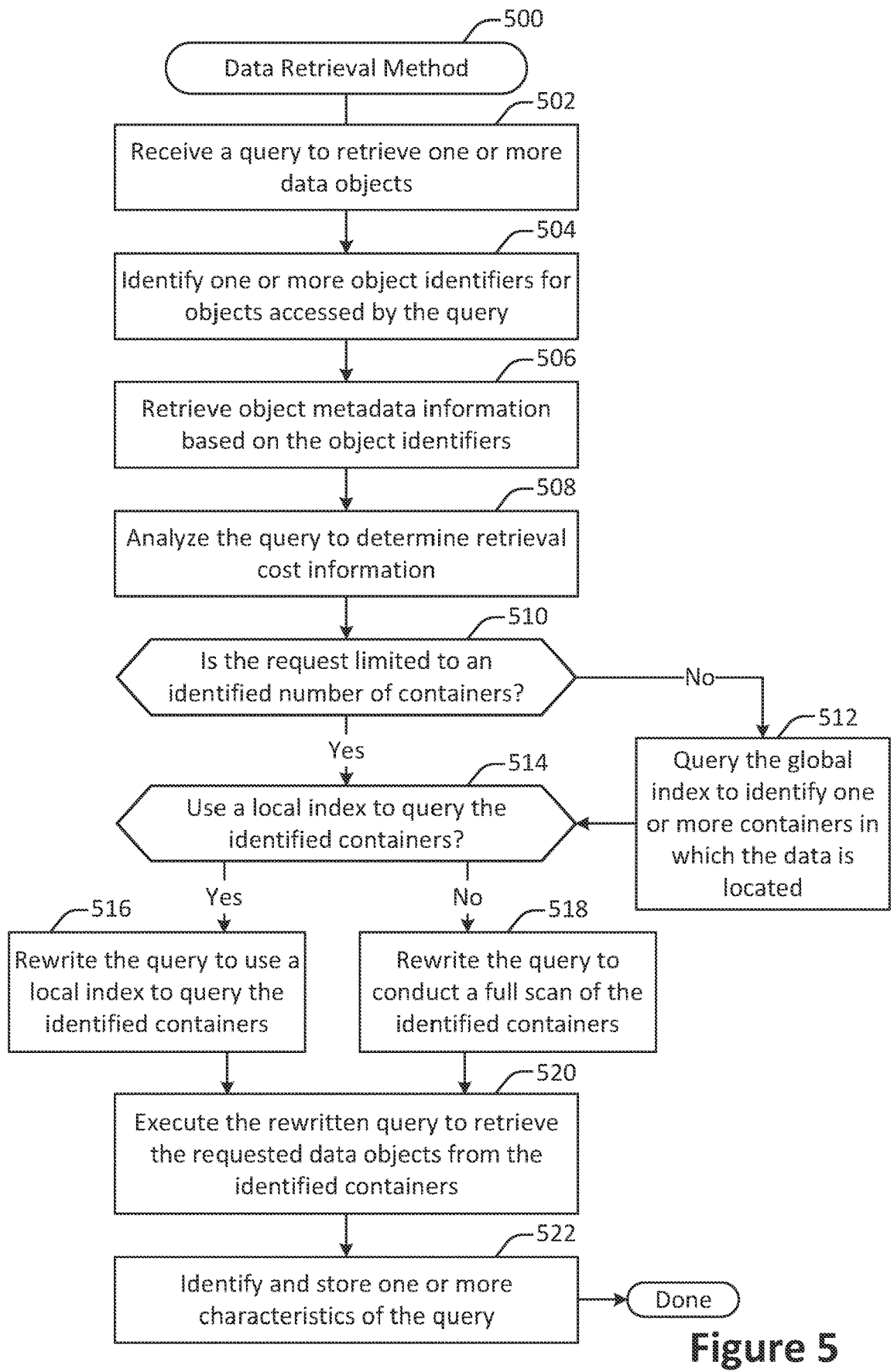
FIG. 5 illustrates an example of a method for data retrieval, performed in accordance with one or more embodiments.

FIG. 5 illustrates an example of a method 500 for data retrieval, performed in accordance with one or more embodiments. According to various embodiments, the method 500 may be performed at one or more components of an on-demand database system. For example, the method 500 may be performed at least in part at an application server such as the application server 850 in communication with the tenant database 822.

A query to retrieve one or more data objects is received at 502. According to various embodiments, the query may be specified in any suitable query language. Suitable query languages may include, but are not limited to: Structured Query Language (SQL), Salesforce Object Query Language (SOQL), MySQL, Oracle, Postgres SQL, MongoDB, Microsoft SQL Server, DB2, Microsoft Access, and SQL-Lite.

In some implementations, the request to retrieve one or more query objects may be generated based on the execution of an application in an on-demand computing services environment. For example, an application may automatically query the database to retrieve a number of Sales Lead objects in order to automatically send an email for each object. As another example, a user may interact with a user interface and may generate a query to retrieve data objects, for example to manually edit those objects.

The query is analyzed at 504 to identify one or more object identifiers for data objects accessed by the query. In some implementations, such objects may be explicitly referred to within the query. For example, the query may involve state a request to retrieve objects of type "Sales Lead" that match one or more criteria. Based on the presence of the object name within the query, the system may determine an object identifier associated with the object name, for instance by accessing a lookup table.

At 506, metadata information is retrieved based on the object identifiers. The metadata information may include any suitable data, including one or more object definitions and/or partition rule entries may be retrieved by querying one or more metadata tables such as those discussed in FIG. 3.

The query is analyzed at 508 to determine retrieval cost information. According to various embodiments, the retrieval cost information may estimate or identify data such as the time required to execute the query, the number of objects retrieved, the volume of data retrieved by the query, the number of containers accessed while executing the query, and/or any other relevant information.

In some implementations, analyzing the query may involve parsing the terms of the query to identify ranges or portions of data accessed by the query. For example, a query may retrieve all Sales Lead entities having an Estimated Dollar Value of between $10,000 and $20,000. The analysis procedure may use this information, in combination with data such as object definitions and/or partition rules retrieved at 506, to identify data such as the identity of containers accessed by the query. For example, the Sales Lead object definition may map the Estimated Dollar Value to Field_321, and the Sales Lead object may be associated with a partition rule that assigns one partition key to Sales Lead objects having an Estimated Dollar Value of between $5,000 and $15,000, and another partition key to Sales Lead objects having an Estimated Dollar Value of between $15,000 and $25,000. From this information, the query analyzer can deduce that executing the query would involve accessing these two containers. In addition, based on information such as the number of entities stored in these two containers, the query analyze may be able to estimate other information, such as a number of objects retrieved, the portion of objects in the containers that will be retrieved, and the total amount of data that will be retrieved.

A determination is made at 510 as to whether the request is limited to an identified number of containers. In some implementations, a request may be limited to an identified number of queries when the request is sufficiently clear that the query analyze can parse the query and identify the containers accessed by the query as a matter of logic based on the information retrieved at 506. In some configurations, the number of queries identified at 506 may be compared with a designated container threshold to determine whether the query analyzer can narrow the predicted scope of the query to a limited number of containers or whether the query will access a very large proportion of the available containers.

If it is determined that the request is not limited to an identified number of containers, then at 512 one or more global indexes are queried to identify one or more containers in which the data to be retrieved by the query is located. According to various embodiments, a global index may index data across all containers. The system may maintain a table that links these indexes with values stored in the containers. Such a table may be implemented as a data structure such as a B-tree or a generalized suffix tree (GST). The global index may be used to narrow the number of containers targeted by the query to a more management level. In such a system, the query analyze may query the global index with one or more values included in the query, and the global index may respond with one or more pointers to containers in which data objects with those values are contained.

According to various embodiments, the querying of the global index may be either explicit or implicit. For example, in some configurations the global index itself may store a pointer to the relevant data block or blocks. In such a configuration, an intermediate lookup need not be performed.

When a set of one or more containers are identified for executing the target query, a determination is made at 514 as to whether to use a local index to query the identified containers. In some implementations, the determination may be made based on comparing the cost of a full scan of those containers to a designated threshold. In some implementations, the designated threshold may be, for instance, the cost of executing the query using a local index. A local index is one that indexes only the local container and does not index across containers.

In some embodiments, a full table scan involves a moderate fixed cost, while an indexed approach involves a low per-entry cost. Accordingly, a query that does not rely on indexed values or that seeks to retrieve a large proportion of all values may be more efficiently executed via a full table scan, while a query that relies on indexed values and/or seeks to retrieve a small proportion of all values may be more efficiently executed via a local index.

In some embodiments, the determination made at 514 may involve further analyzing the information determined at operations such as 502, 506, and 512. For example, ranges of data expressed in the query may be compared with the contents of the identified containers to determine a proportion of the data in the container that is accessed by the query.

If it is determined to use a local index, then at 516 the query is rewritten to use a local index. If instead it is determined to use a full scan, then at 518 the query is rewritten to use a full scan. In some embodiments, rewriting the query may involve translating the query from the language in which it is received at 502 to a standardized language suitable for the database. For example, the query may be received at 502 in any of a variety of languages and may then be rewritten at operations 516 or 518 into a standardized language specific to the database implementation employed.

At 520, the rewritten query is executed to retrieve the requested data objects from the identified container. According to various embodiments, executing the query may involve, for example, transmitting the query to multiple machines in a distributed database system. The results returned by those machines may then be aggregated into a single query result. That query result may be transmitted to a destination such as a client machine, a storage device, or any other suitable network endpoint.

One or more of the characteristics of the query are identified and stored at 522. In some implementations, the characteristics may include information such as the execution time, the number of containers accessed, the types of objects accessed, the organization identifier associated with the query, the performance of the query analyzer, the number of containers accessed, and/or the volume of data accessed. The query characteristics may be used to analyze, for example, the assignment of partition keys and/or the characteristics of containers. For instance, the query characteristics may be used to facilitate the assignment of containers to different types of storage devices (e.g., relatively slower or faster storage devices).

Figure 6:
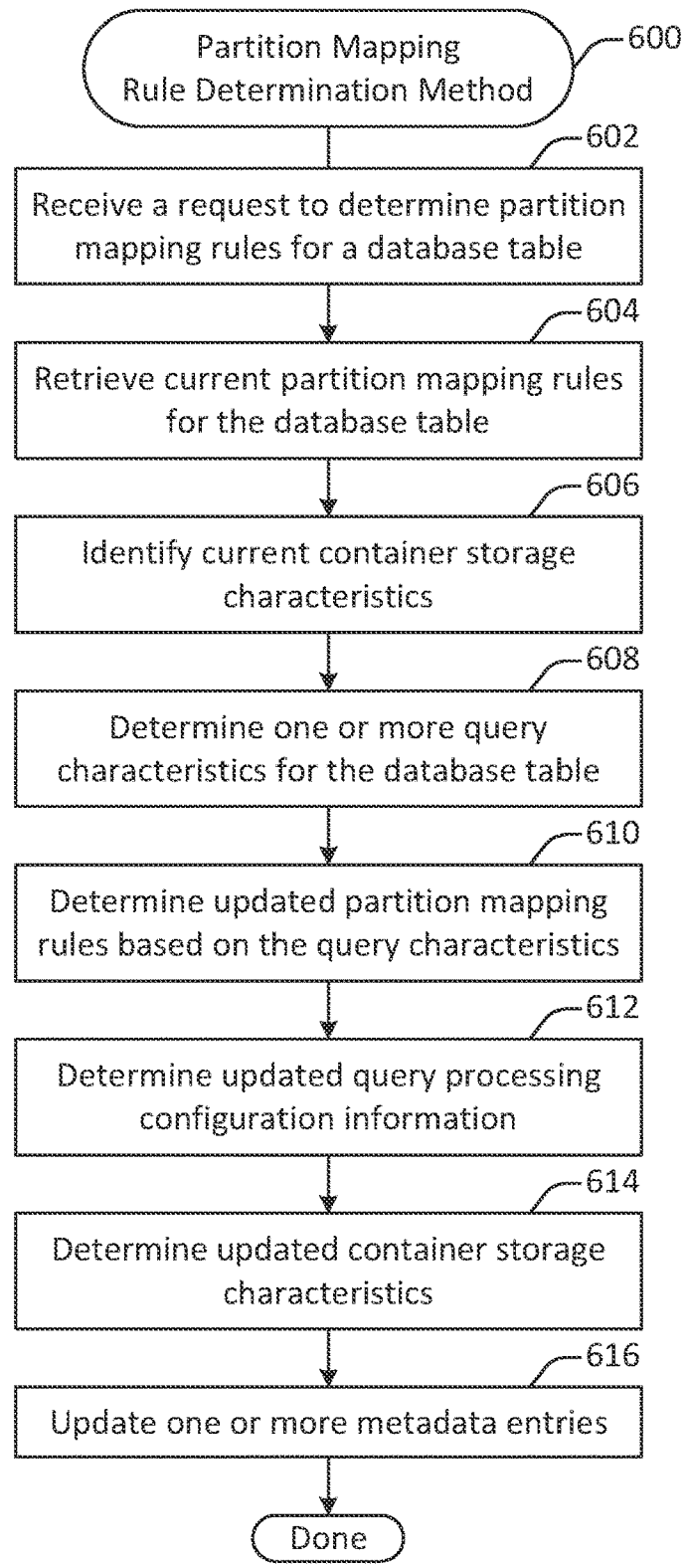
FIG. 6 illustrates an example of a method for determining one or more partition rules, performed in accordance with one or more embodiments.

FIG. 6 illustrates an example of a method 600 for determining one or more partition rules, performed in accordance with one or more embodiments. According to various embodiments, the method 600 may be performed at one or more components of an on-demand database system. For example, the method 600 may be performed at least in part at an application server such as the application server 850 in communication with the tenant database 822.

A request to determine partition mapping rules is received at 602. According to various embodiments, the request may be generated periodically or at scheduled times. For instance, a database table may be analyzed for repartitioning at an interval of a designated number of times per hour, day, week, month, or year.

In some implementations, a database table may be periodically repartitioned over time to account for changing usage patterns. For example, an organization may tend to query one set of records more during the summer and another set of records more during the winter. As another example, an organization may tend to query records created in the recent past more frequently than records created in the distant past.

In some embodiments, the request may be generated when a triggering condition is detected. For example, the request may be generated when database performance falls below a designated threshold. As another example, the request may be generated when specified by a user such as a database administrator. As yet another example, the request may be generated after a designated number of database entries have been queried or stored.

Current partition mapping rules for the database table are retrieved at 604. In some embodiments, the current partition mapping rules may be retrieved by querying the partition rule table 360 for any rules that apply to objects stored in the database table.

Current container storage characteristics are determined at 606. In some implementations, current container storage characteristics may be determined by identifying one or more container identifiers associated with the table. Such container identifiers may be determined by identifying the container identifiers mapped to by the partition keys included in the retrieved partition mapping rules.

In some embodiments, the container identifiers may then be used to query the container status table 342. The container storage characteristics may include information such as the type of data stored in the container, the amount of data stored in the container, and/or the type of physical media on which the container is stored. As discussed herein, a container may be stored on any of various types of physical media, including for instance fast access solid state drives or relatively slow spinning disk drives.

One or more query characteristics for the database table are determined at 608. In some implementations, the query characteristics that are determined may include some or all of those stored at 522. For example, the query characteristics may include information such as the execution time, the number of containers accessed, the types of objects accessed, the organization identifier associated with the query, the performance of the query analyzer, the number of containers accessed, and/or the volume of data accessed.

Updated partition mapping rules are determined at 610 based on the query characteristics. According to various embodiments, determining updated partition mapping rules may involve comparing the cost of clustering and query optimization. For instance, one or more inefficiencies may be identified in the query characteristics determined at 608. Then, the system may estimate the database resources gained by repartitioning the database table to improve performance via clustering. The system may also estimate the performance increase achieved by changing the way in which queries are rewritten, as discussed with respect to FIG. 4.

In some embodiments, to estimate efficiency gains from re-partitioning, past database access requests may be used to predict the type of database access requests that will be received in the future. The predicted database access requests may then be used to estimate the cost both with and without re-partitioning. The difference between these two values may be used as the estimated efficiency gain.

In some implementations, one or more policies may be used to transfer data to less expensive storage devices. For example, data that is rarely used, data that is retained only for compliance purposes, or other such candidates may be moved to less expensive storage devices.

In particular embodiments, one or more partition mapping rules may be determined at least in part based on inherent characteristics of manually specified clustering criteria. For example, a systems administrator may specify that objects meeting one or more characteristics should be grouped together. Such a rule may be useful in situations where past access patterns are likely to be poor predictors of future access patterns.

In some implementations, determining updated partition mapping rules may involve aggregating database entries that tend to be retrieved and/or updated together, as revealed by the query characteristics determined at 608. For instance, records of a given type may be retrieved for a given organization in clusters based on any individual field or combination of fields included with the records, such as name, customer account, number of employees, state, type, date, or any other data associated with a record.

According to various embodiments, a predicted read-write usage may be determined based on any suitable information. Such information may include one or more of manually-specified partitioning, past retrieval history, or policy-based partitioning.

According to various embodiments, updated query processing configuration information is determined at 612. The updated query processing configuration information may include one or more instructions for altering the way in which queries are rewritten to improve performance and/or take advantage of the database table partitioning. For example, the query builder or query rewriter may identify the containers needed to satisfy a query and then generate an additional query filter where the partition key assumes one or more of these values.

In some implementations, if the query builder or query rewriter cannot reliably determine the partition in which matching data is located, then it may employ a global index to access the data. In such a configuration, the global index may provide a transactionally-consistent view of a row's location.

In some embodiments, such as during repartitioning, a row may be known to be in either the source partition or one of a set of target partitions. In such a situation, the query builder may generate a "union all" query where the two parties of the "union all" query are queries issued against the container in which a row may be located.

Updated container storage characteristics are determined at 614. In some implementations, determining updated container storage characteristics may involve such operations as changing the storage type of a storage container. For example, a container may be changed from being stored on a relatively slow but inexpensive storage device to being stored on a relatively fast but expensive storage device.

In particular embodiments, a container may not actually be moved from one device to another, in order to avoid a database performance cost. Instead, data may be repartitioned from being stored on one container having a first set of storage characteristics to another existing container having a second set of storage characteristics. Alternately, a new container may be created having a second set of storage characteristics, and the table may be repartitioned to use the new container.

One or more metadata entries are updated at 616. In some implementations, metadata entries that may be updated may include one or more container status entries stored in the container status table 342. For instance, the usage data for a container may be updated to reflect the partitioning performed in FIG. 6.

In some implementations, updating one or more metadata entries may involve performing one or more operations for assigning partition keys and container identifiers, and/or other operations related to partition rule application. Additional details regarding the application of partition rules are discussed throughout the application, and in particular with respect to FIG. 7.

Figure 7:
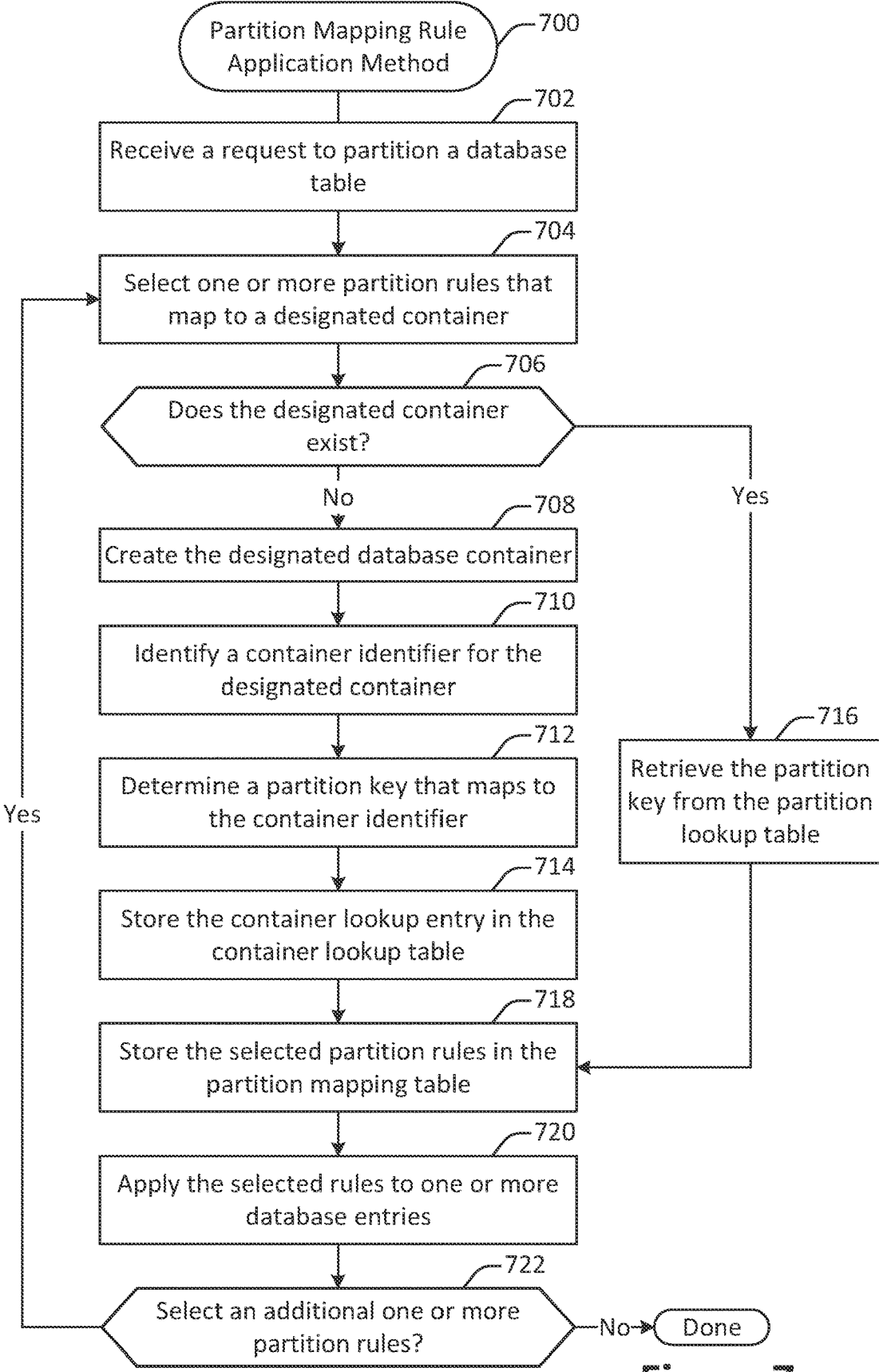
FIG. 7 illustrates an example of a method for configuring one or more partition rules, performed in accordance with one or more embodiments.

FIG. 7 illustrates an example of a method 700 for configuring one or more partition rules, performed in accordance with one or more embodiments. According to various embodiments, the method 700 may be performed at one or more components of an on-demand database system. For example, the method 700 may be performed at least in part at an application server such as the application server 850 in communication with the tenant database 822.

A request to partition a database table is received at 702. In some implementations, the request may be generated upon the determination of a new or updated set of partition mapping rules. For example, the request may be generated automatically at the termination of the method 600 shown in FIG. 6. As another example, the request may be generated periodically, or when a designated number of partition rule changes are detected. As still another example, partition rules may be applied on a rate-limited basis to maintain database availability and avoid an excessive number of blocked records.

At 704 one or more partition rules are selected. According to various embodiments, the partition rules may be retrieved from a partition rule table such as the table 360 shown in FIG. 3. In some configurations, the partition rule or rules retrieved may map to the same database container.

A determination is made at 706 as to whether the designated database container exists. According to various embodiments, the determination may be made by performing one or more operations such as querying the container status table 342 and/or the partition lookup table 322.

If the designated database container does not exist, then the container may be created at 708. In some implementations, a container may be created by transmitting a request to the database back end that a new container be created. When a container is created in this way, the database back end may respond with a container identifier. The container identifier may then be used to create a new entry in the container status table 342. Alternately, the container status table 342 may be queried to identify an identifier for an unused or underused container.

At 710, a container identifier for the designated container is identified. According to various embodiments, the container identifier may be identified by any of a variety of suitable operations such as receiving it from the database back end for a newly created container, retrieving it from the partition lookup table 322, or retrieving it from the container status table 342.

A partition key is determined at 712 that maps to the container identifier. In some embodiments, a hash function may be used to map partition keys to container identifiers. In such a configuration, the key space may be searched to identify a partition key that maps to the container identifier. Once found, the partition key and container identifier may be stored in the partition lookup table. The partition lookup table may then be used to store such combinations to avoid subsequent searching. However, during query execution the system may avoid the cost of querying the partition lookup table and may instead simply apply the hash function to the partition key.

In some embodiments, list partitioning may be used. In a system based on list partitioning, each combination of partition key and container identifier is manually created and added to the partition lookup table. Partition keys may be created in any of various ways so long as each partition key maps to only one container identifier.

A container lookup entry is stored in the container lookup table at 714. In some implementations, the container lookup entry may include the container identifier identified at 710 and the partition key determined at 712. At 716, if it is determined that the designated container does exist, then the partition key for the container is retrieved from the partition lookup table.

The selected partition rules are stored in the partition mapping table at 718. According to various embodiments, each partition mapping rule may be updated to refer to the identified partition key.

At 720, the selected rules are applied to one or more database entries. In some implementations, a rule may be applied to a database entry when the entry is updated. Alternately, or additionally, a rule may be applied to a database entry when the entry is retrieved via a query. As another possibility, the database system may scan one or more database entries, for instance on a periodic basis or upon the creation of new rules, to identify rules for updating.

A determination is made at 722 as to whether to select an additional one or more partition rules. In some implementations, rules may continue to be selected so long as unprocessed rules are available. Alternately, the application and/or selection of rules may be performed in a rate-limited fashion in order to avoid imposing an excessive load on the database system.

Figure 8:
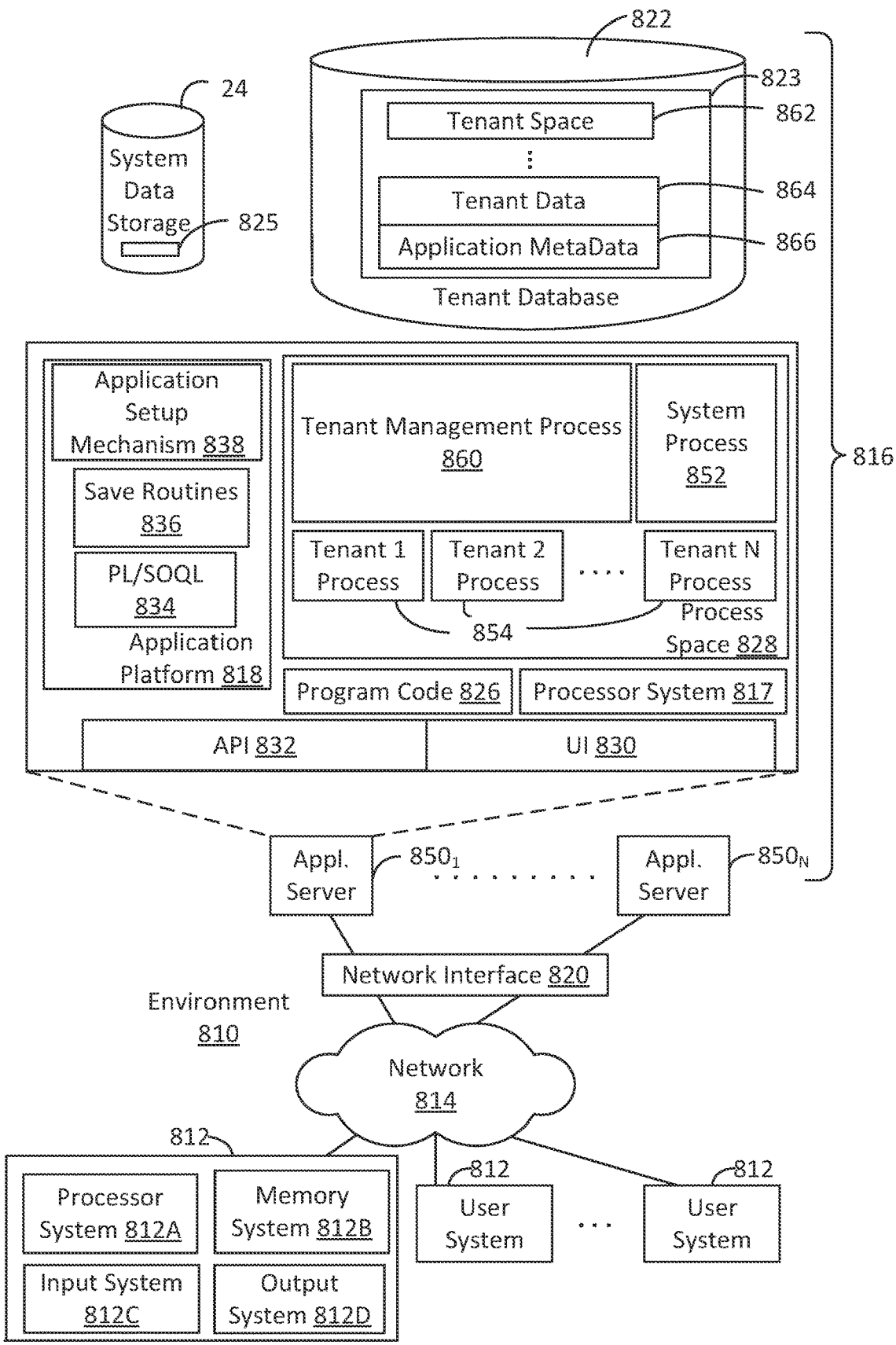
FIG. 8 shows a block diagram of an example of an environment that includes an on-demand database service configured in accordance with some implementations.

FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 816. Such applications may be developed by the database service provider or by users or third-party application developers accessing the service. Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin, observed response time, etc. Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based database interaction and query system. For example, in some implementations, system 816 may include application servers configured to implement and execute requests to query and/or update database tables in the context of software applications related to sales lead management, service contract management, customer relations management, or other database-related applications. The application servers may be configured to provide related data, code, forms, web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data, unless such data is expressly shared.

Several elements in the system shown in FIG. 8 include conventional, well-known elements that are explained only briefly here. For example, user system 812 may include processor system 812A, memory system 812B, input system 812C, and output system 8 12D. A user system 812 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 812 to access, process and view information, pages and applications available from system 816 over network 814. Network 814 may be any network or combination of networks of devices that communicate with one another, such as any one or any combination of a LAN (local area network), WAN (wide area network), wireless network, or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as a database administration system, a social networking system, and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MTS arrangement. By way of example, one tenant organization may be a company that employs a sales force where each salesperson uses system 816 to manage their sales process. Thus, a user in such an organization may maintain contact data, leads data, customer follow-up data, performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824. An application server 850 of system 816 may automatically generate one or more SQL statements (e.g., one or more SQL queries) that are designed to access the requested data. System data storage 824 may generate query plans to access the requested data from the database.

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
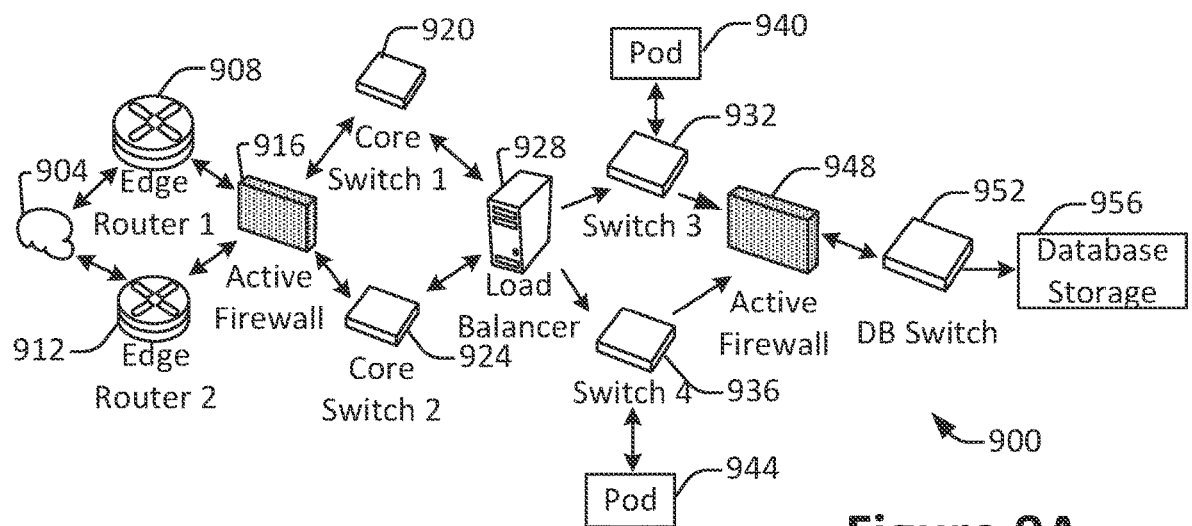
FIG. 9A shows a system diagram of an example of architectural components of an on-demand database service environment, configured in accordance with some implementations.

FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems?12 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process database partitioning, database query, and/or database performance information.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the internet.

In one or more implementations, the firewall 916 may protect the inner components of the environment 900 from internet traffic. The firewall 916 may block, permit, or deny access to the inner components of the on-demand database service environment 900 based upon a set of rules and/or other criteria. The firewall 916 may act as one or more of a packet filter, an application gateway, a stateful filter, a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924. Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

Figure 9B:
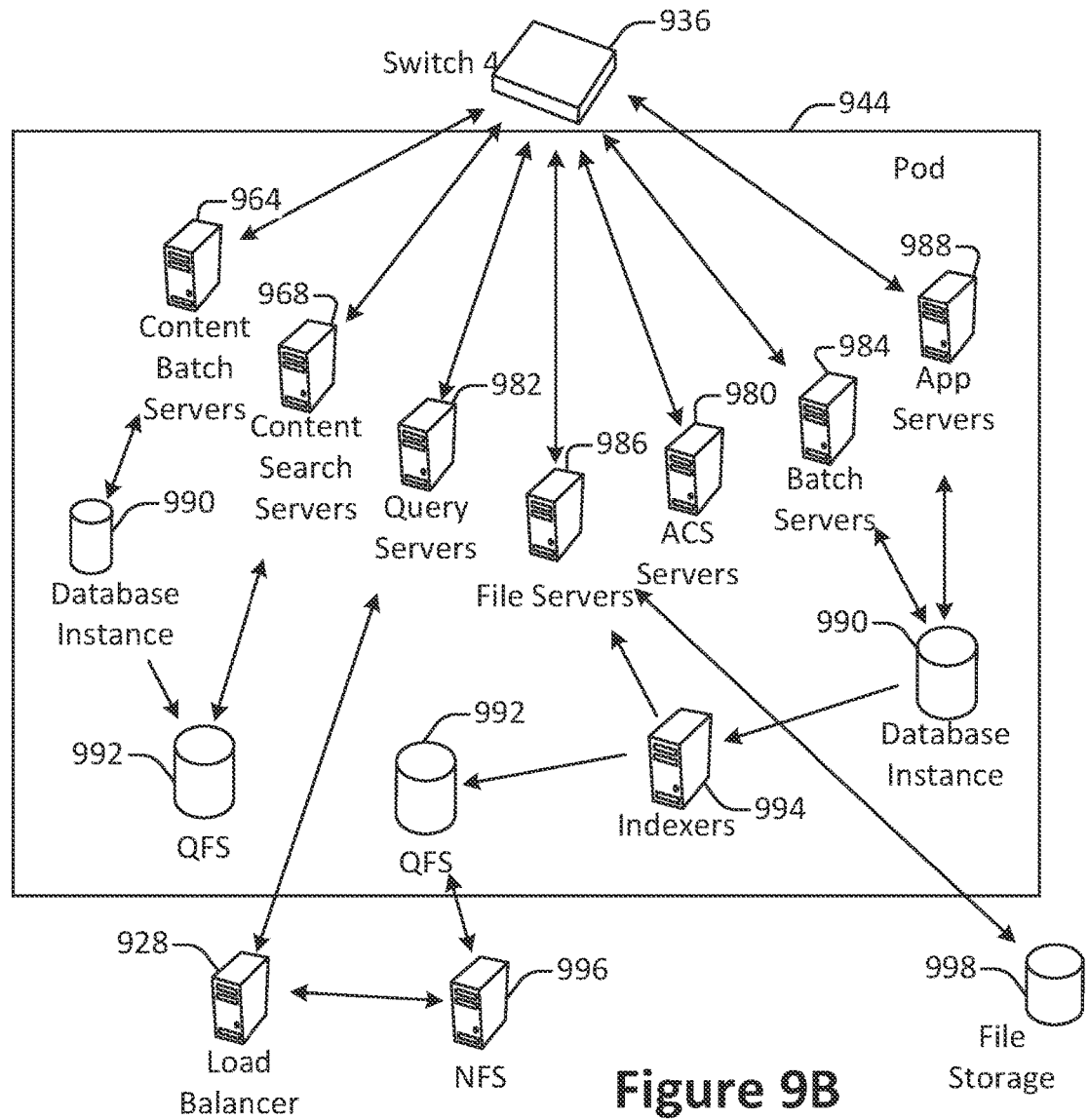
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968, query servers 982, file servers 986, access control system (ACS) servers 980, batch servers 984, and app servers 988. Also, the pod 944 may include database instances 990, quick file systems (QFS) 992, and indexers 994. Some or all communication between the servers in the pod 944 may be transmitted via the switch 936. In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable filesystem may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928, which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOBS), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs, which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 10:
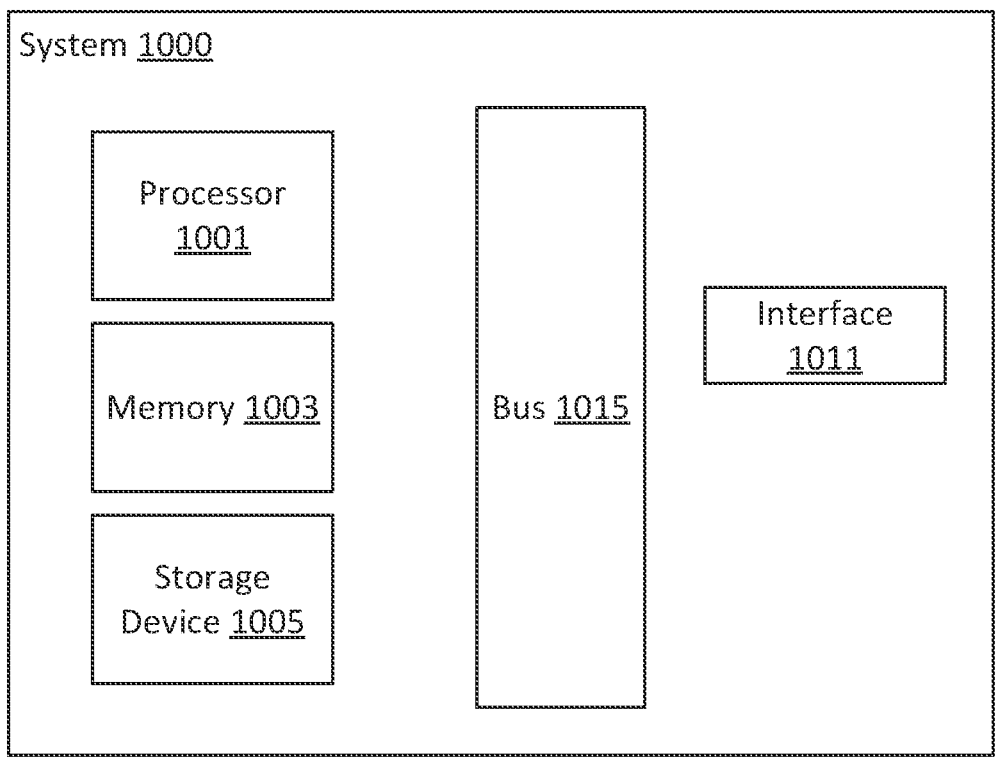
FIG. 10 illustrates one example of a computing device, configured in accordance with one or more embodiments.

FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
   receiving via a communication interface a request to retrieve data from a database table storing a plurality of database entries in one or more containers, the plurality of database entries including a respective one or more data values arranged in a respective one or more data fields in accordance with a respective data object definition, the database table being associated with a plurality of data object definitions including a first data object definition associated with a first partition rule and a second data object definition associated with a second partition rule different from the first partition rule, the request including a first database query identifying one or more characteristics of the data to be retrieved;
   applying the first partition rule to the one or more characteristics to identify a subset of the one or more containers, the one or more characteristics identifying the first data object definition;
   determining via a processor a second database query based on the first database query, the second database query being limited to the subset of the one or more containers; and
   transmitting an instruction to execute the second database query to retrieve the data.

2. The method recited in claim 1, wherein determining the second database query involves determining a respective computing cost estimate of each of a plurality of alternative database queries including the second database query.

3. The method recited in claim 1, wherein the second database query is configured to conduct a full scan of the subset of the one or more containers.

4. The method recited in claim 1, wherein the second database query is configured to employ an index that is local to a designated container of the subset of the one or more containers.

5. The method recited in claim 1, wherein the first database query and the second database query are expressed in different query languages.

6. The method recited in claim 1, the method further comprising:
   querying a global index table based on the one or more characteristics, the global index table including a global index that spans the database table.

7. The method recited in claim 1, wherein the first partition rule is formulated as a Boolean expression over one or more data fields.

8. The method recited in claim 7, wherein the first data object definition identifies a respective data type for each of the data fields.

9. The method recited in claim 8, wherein the first partition rule can be applied to the one or more data fields without accessing the first data object definition.

10. The method recited in claim 1, wherein the first partition rule includes a partition key, and wherein the partition key corresponds to a designated container identifier associated with a designated container of the subset of the one or more containers.

11. The method recited in claim 10, wherein applying a designated function to the partition key yields the designated container, the designated function selected from the group consisting of: a hash function and an identity function.

12. The method recited in claim 1, wherein the database table resides within a multi-tenant database system, and wherein the plurality of database entries are associated with a plurality of tenant organizations, and wherein the first partition rule is specific to a designated tenant organization of the plurality of tenant organization.

13. A database system implemented using a server system, the database system comprising:
   a communication interface configurable to a request to retrieve data from a database table storing a plurality of database entries in one or more containers, the plurality of database entries including a respective one or more data values arranged in a respective one or more data fields in accordance with a respective data object definition, the database table being associated with a plurality of data object definitions including a first data object definition associated with a first partition rule and a second data object definition associated with a second partition rule different from the first partition rule, the request including a first database query identifying one or more characteristics of the data to be retrieved; and
   a processor configurable to:
      apply the first partition rule to the one or more characteristics to identify a subset of the one or more containers, the one or more characteristics identifying the first data object definition, determine a second database query based on the first database query, the second database query being limited to the subset of the one or more containers, and transmit an instruction to execute the second database query to retrieve the data.

14. The database system recited in claim 13, wherein determining the second database query involves determining a respective computing cost estimate of each of a plurality of alternative database queries including the second database query.

15. The database system recited in claim 13, wherein the second database query is configured to conduct a full scan of the subset of the one or more containers.

16. The database system recited in claim 13, wherein the second database query is configured to employ an index that is local to a designated container of the subset of the one or more containers.

17. One or more non-transitory computer readable media having instructions stored thereon for performing a method, the method comprising:

receiving via a communication interface a request to retrieve data from a database table storing a plurality of database entries in one or more containers, the plurality of database entries including a respective one or more data values arranged in a respective one or more data fields in accordance with a respective data object definition, the database table being associated with a plurality of data object definitions including a first data object definition associated with a first partition rule and a second data object definition associated with a second partition rule different from the first partition rule, the request including a first database query identifying one or more characteristics of the data to be retrieved;

applying the first partition rule to the one or more characteristics to identify a subset of the one or more containers, the one or more characteristics identifying the first data object definition;

determining via a processor a second database query based on the first database query, the second database query being limited to the subset of the one or more containers; and transmitting an instruction to execute the second database query to retrieve the data.

18. The one or more non-transitory computer readable media recited in claim 17, wherein determining the second database query involves determining a respective computing cost estimate of each of a plurality of alternative database queries including the second database query.

19. The one or more non-transitory computer readable media recited in claim 17, wherein the second database query is configured to conduct a full scan of the subset of the one or more containers.

20. The one or more non-transitory computer readable media recited in claim 17, wherein the second database query is configured to employ an index that is local to a designated container of the subset of the one or more containers.

* * * * *